United States Patent [19]

Stöhr et al.

[11] Patent Number: 4,757,461
[45] Date of Patent: Jul. 12, 1988

[54] PROCESS FOR GRAPHICALLY REPRESENTING A STRUCTURE

[75] Inventors: Wilfried Stöhr, Neulingen; Rudi Grimm, Stutensee-Blankenloch; Elisabeth Opitz, Graben-Neudorf, all of Fed. Rep. of Germany

[73] Assignee: Dr. Johannes Heidenhain GmbH, Traunreut, Fed. Rep. of Germany

[21] Appl. No.: 688,564

[22] Filed: Jan. 3, 1985

[30] Foreign Application Priority Data

Jan. 13, 1984 [DE] Fed. Rep. of Germany ....... 3401060

[51] Int. Cl.⁴ ............................................. G06F 15/46
[52] U.S. Cl. .................................. 364/518; 340/723; 364/512
[58] Field of Search ........ 364/512, 518, 900 MS File, 364/522; 340/723, 724, 732, 734

[56] References Cited

U.S. PATENT DOCUMENTS

| 3,927,948 | 12/1975 | Cox et al. | 364/512 X |
| 4,127,849 | 11/1978 | Okor | 364/522 X |
| 4,275,449 | 6/1981 | Aish | 364/512 |
| 4,536,848 | 8/1985 | d'Entremont et al. | 364/521 X |
| 4,551,810 | 11/1985 | Levine | 364/512 X |
| 4,586,145 | 4/1986 | Bracewell et al. | 364/512 |

FOREIGN PATENT DOCUMENTS 0083836 7/1983 European Pat. Off. .
0121100 10/1984 European Pat. Off. .
7130870 4/1972 France .
2140937 5/1983 United Kingdom .

OTHER PUBLICATIONS

The Polygon Package, E. E. Barton and I. Buchanan vol. 12, No. 1, Jan. 1980.
Pioneering in Technology . . . Apr. 27, 1980.

Primary Examiner—Gary V. Harkcom
Assistant Examiner—H. R. Herndon
Attorney, Agent, or Firm—Willian Brinks Olds Hofer Gilson & Lione Ltd.

[57] ABSTRACT

A process for graphically representing a simulated workpiece as processed by a numerically-controlled machine tool. Stored data defining the workpiece and the tool as well as program data defining relative movement therebetween are used to generate polygons which represent the workpiece and the tool and the path of movement of the tool. These polygons are hierarchically ordered and liked. Corresponding to the hierarchic order of the polygons, intersection point calculations in the linkage are made only for the workpiece polygons which overlap the tool polygon. The image of the processed workpiece is generated successively through the continuous superposition of the changing workpiece polygons with the processing polygons corresponding to the tool and its path. Workpiece edges which drop out are erased, and invisible workpiece edges are nto represented.

15 Claims, 5 Drawing Sheets

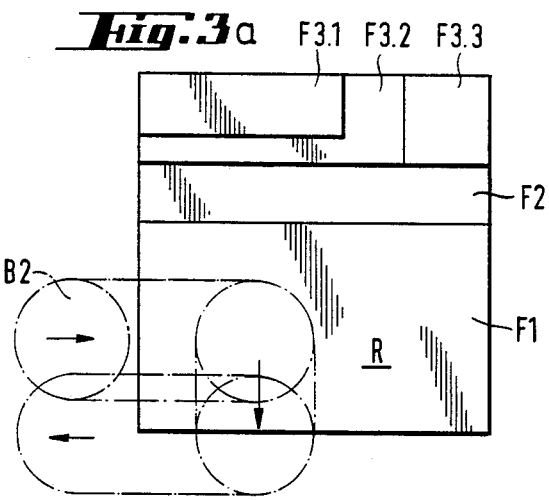
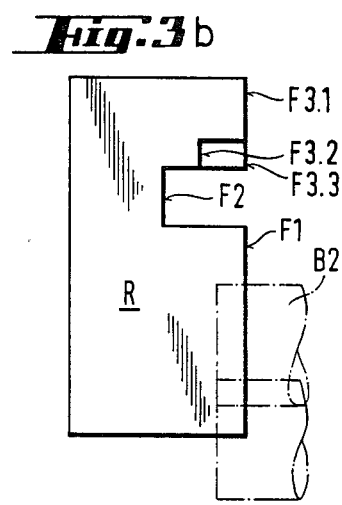
Fig. 3a  Fig. 3b
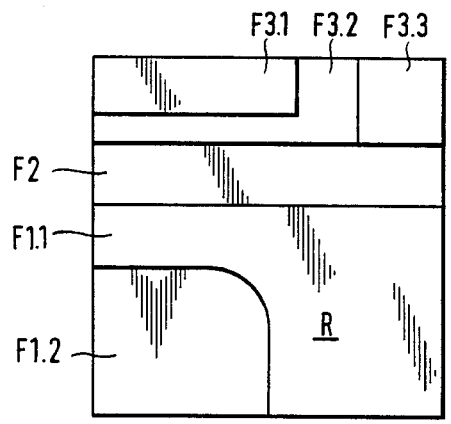
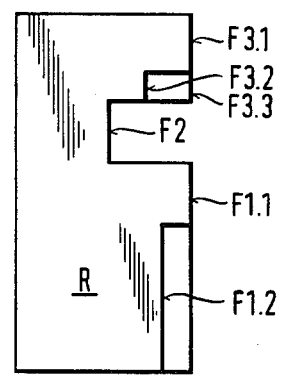
Fig. 3c  Fig. 3d

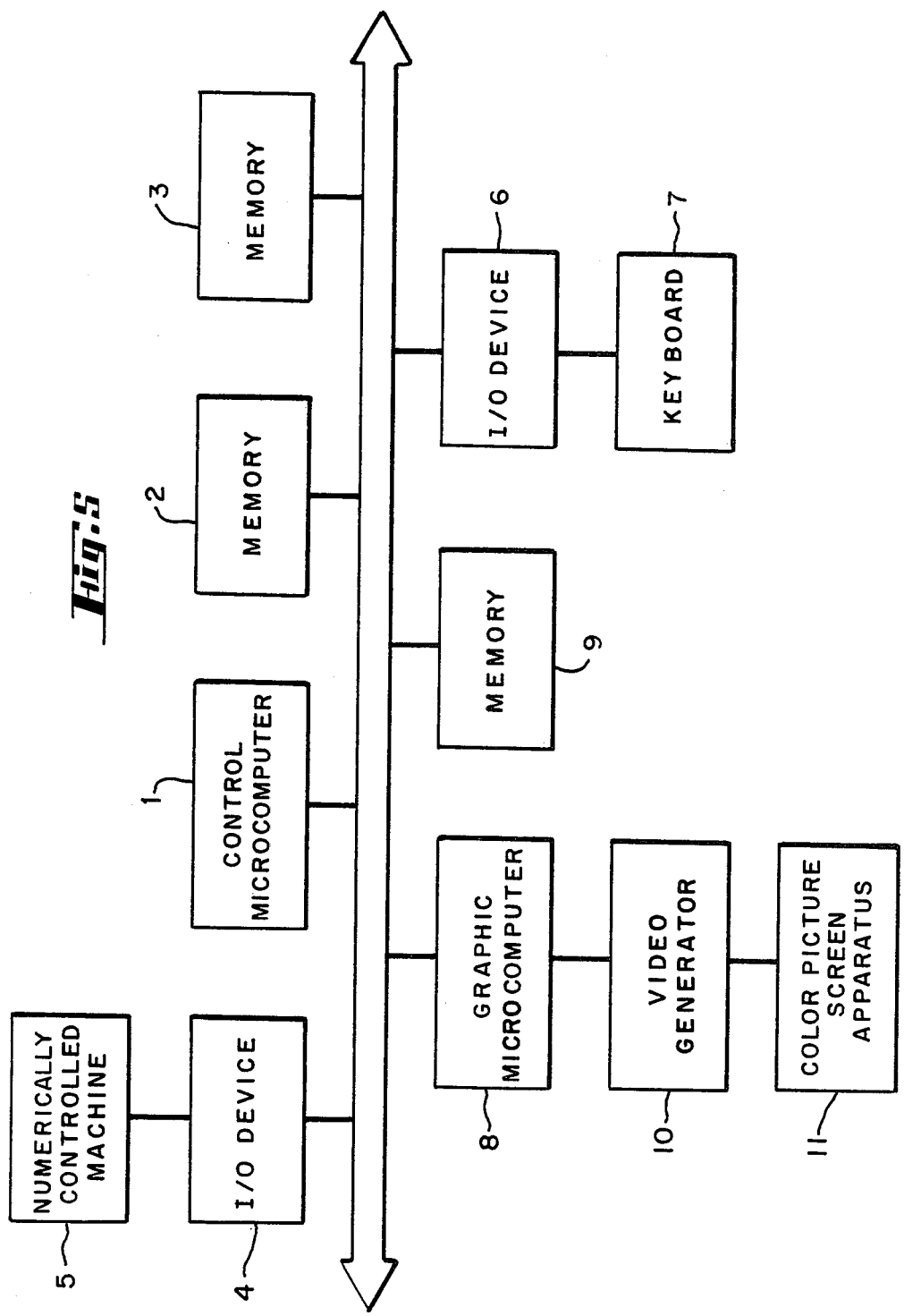

PROCESS FOR GRAPHICALLY REPRESENTING A STRUCTURE

BACKGROUND OF THE INVENTION

This invention relates to a process for graphically representing a structure that can be altered by an object, of the type in which both the structure and the object, as well as relative movements between the structure and the object, are represented by respective data structures.

It is a known practice in the field of computer-aided design to represent bodies in perspective on the picture screen of a computer unit by means of internal computer models. In general, the process for generating true-to-measure internal computer models requires a high expenditure both in computation and in memory or storage space, since large data structures must be processed. In general, this approach is not well suited for real time representation of a processing course by means of an economical micro-computer system, for example in a numerically controlled machine tool. The generation of the data structure for the entire workpiece from the component data, i.e., from the workpiece blank and the tool processing paths, would require large storage requirements and large computing time requirements.

At present, path controls on the market for numerically controlled machines assist the programmer in a wide variety of ways in translating a desired surface defined by a technical drawing into a corresponding numerical control program. Many of the known processes for verifying a numerical controlled program in contemporary controls can be classified as follows:

Program Checking Prior To Execution

The generally used methods for visualizing programming errors prior to run off of a program include simulation of the workpiece processing with partial three-dimensional representation of the generated contours and the travelled tool paths. However, these representations typically do not show the final workpiece or even geometric linkages between the individual partial contours. Fundamentally, only the individual tool movements are made visible, without reference to the workpiece blank or to other movements. For this reason, the typical graphical representations in use today of the generated contour surfaces by their boundary lines, even in connection with relatively simple processing sequences, are static, difficult to comprehend images.

One prior art process simulates a machining operation by providing two-dimensional representations which are "etched" to simulate the removal of material from the workpiece by the tool. In this process different shadings are erased or changed in order to allow various surface depths on the simulated workpiece to be distinguished during processing. In particular, when processing is accomplished in several planes this approach may lose information. Furthermore, this approach is unsuitable for three-dimensional representations of the workpiece.

Program Checking During Program Execution

Real time simulation of the processing course for monitoring a numerical control program by representing all generated contours without geometric linkage is known.

The two- and three-dimensional processes described above permit only a linkage-free superposition of the tool paths or predefined partial contours without representation of the resulting workpiece contours.

SUMMARY OF THE INVENTION

The present invention is directed to a process for depicting a variable structure, which requires no great expenditure in calculation and which is therefore practical for use with relatively simple equipment.

According to this invention, a process for graphically representing a structure is provided which includes the step of generating a set of polygons representative of the structure from the respective stored data structure. A processing region is then determined corresponding to the object or tool and the selected relative movement between the object and the structure. Intersections are then determined between the processing region and only those polygons which overlap the processing region. The data structure for the structure is then altered to reflect changes to those polygons intersected by the processing region in order to represent the altered structure.

This invention provides particular advantages in that the calculation required to implement this process is substantially reduced with respect to the prior art approaches described above. For this reason, the process of this invention can be carried out with a microprocessor system and real time representation is made possible. Furthermore, perspective representations are possible in spite of the severely reduced expenditure in calculation. Similarly, it is possible to use the process of this invention to show enlarged partial views and to represent in color individual processing cycles or surface zones.

The invention itself, together with further objects and attendant advantages, will best be understood by reference to the following detailed description, taken in conjunction with the accompanying drawings.

BRIEF DESCRIPTION OF THE DRAWINGS

FIGS. 3a through 3d show the workpiece of FIGS. 1 and 2 in a third processing operation.

FIG. 5 is a block circuit diagram of a system for executing the preferred embodiment of the method of this invention.

DETAILED DESCRIPTION OF THE PREFERRED EMBODIMENTS

Figure 1A:
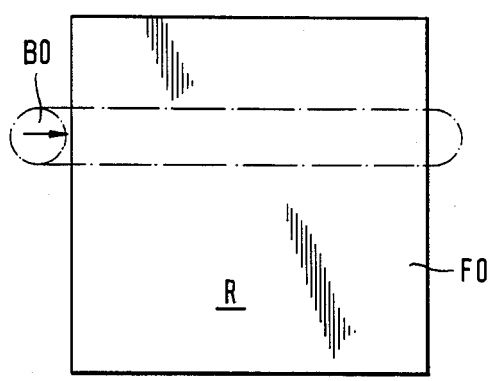
FIGS. 1a through 1d show a workpiece before and after a first processing operation.

Turning now to the drawings, FIG. 1a represents a workpiece blank R, the visible surface of which is determined by a polygon that bounds the surface FO. A tool constructed as a shaft milling tool which moves through a preprogrammed tool path is represented as a processing polygon BO superimposed on the blank R which defines the surface FO.

Figure 1B:
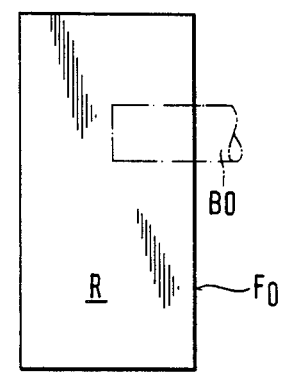

In FIG. 1b this situation is represented in side view, in order to indicate the third dimension, corresponding to the processing depth of the tool.

Figure 1C:
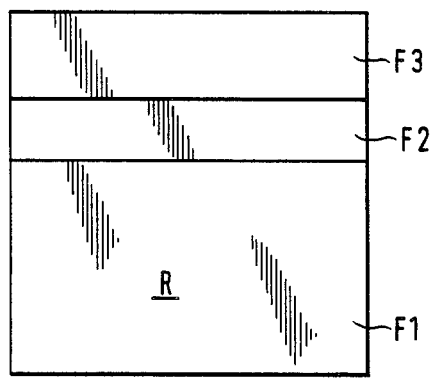
Figure 1D:
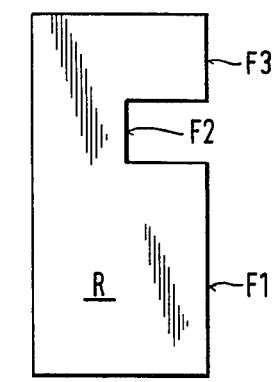

In FIGS. 1c and 1d the workpiece R is represented as processed according to the processing operation indicated in FIGS. 1a and 1b. In FIGS. 1c and 1d it is apparent that the original surface FO has been subdivided by this working operation into three partial surfaces, F1, F2, and F3. The surface F2 lies at a deeper level than the surfaces F1, F3, in correspondence to the so called infeed or depth of cut of the tool.

In order to represent this workpiece processing on the picture screen of a numerically-controlled machine tool, a computer, which may be a micro-computer, is programmed to process data structures indicative of the workpiece, the tool, and relative movements therebetween. The computer generates the polygons FO, BO. The polygon FO is generated from the workpiece data structure and the processing polygon BO is generated from the dimensions of the tool and its preprogrammed path of movement.

The computer is programmed to link these polygons FO, BO such that in accordance with intersection point calculations it is possible to determine where and whether the workpiece and tool are in engagement.

Figure 2A:
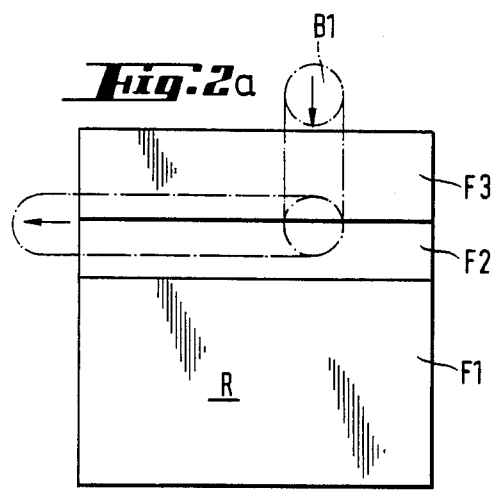
FIGS. 2a through 2d show the workpiece of FIG. 1 in a second processing operation.
Figure 2B:
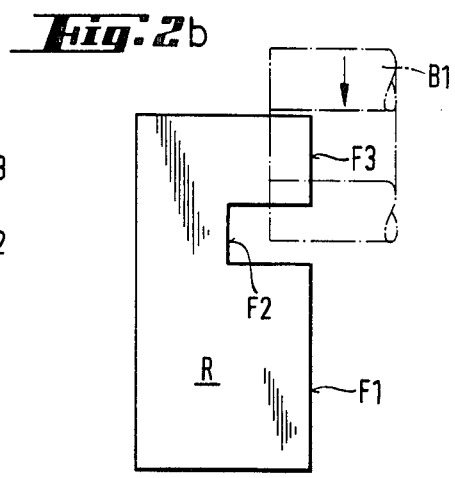
Figure 2C:
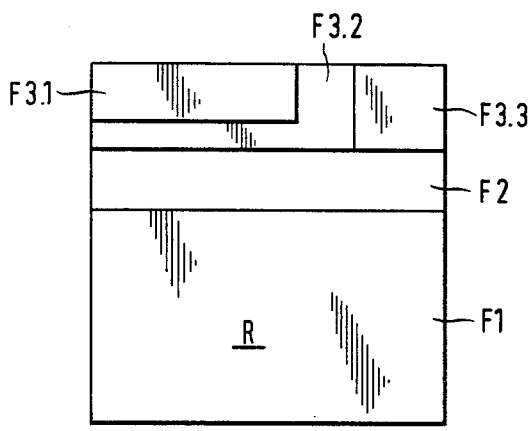
Figure 2D:
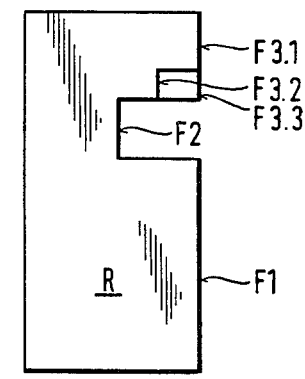
Figure 4A:
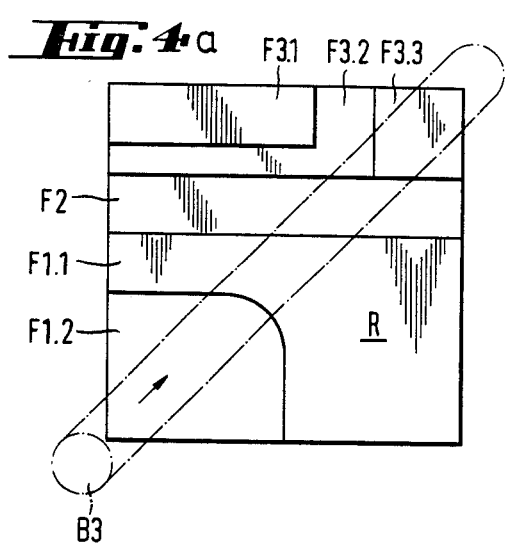
FIGS. 4a through 4d show the workpiece of FIGS. 1, 2 and 3 in a fourth processing operation.
Figure 4B:
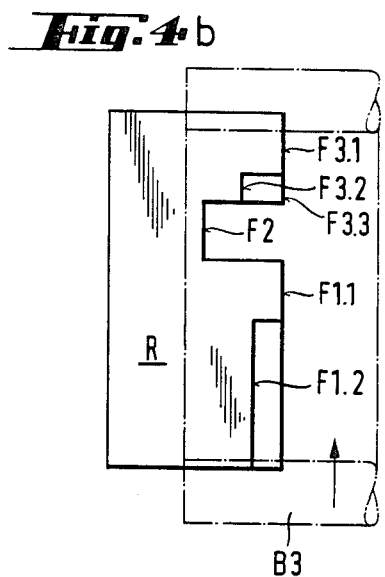
Figure 4C:
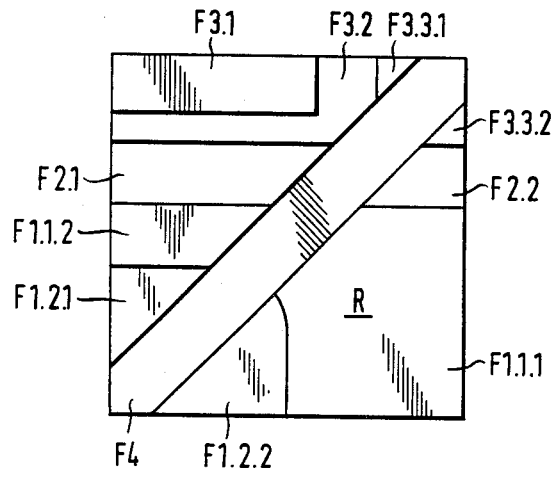
Figure 4D:
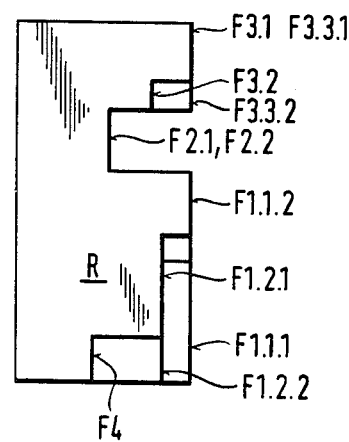

FIGS. 2a and 2b relate to a second processing operation in which the workpiece polygons F1, F2 and F3 are superposed on the processing polygon B1. The workpiece polygons F1–F3 are linked with the processing polygon B1 in accordance with the approach outlined above by calculating intersection points of the polygons, taking into account the third dimension.

In accordance with this embodiment of this invention, the polygons F1, F2 and F3 are hierarchically ordered. That is, when the processing polygon B1 is superposed on the workpiece polygons F1, F2, F3, intersection point calculations are only made for those polygons that are directly affected by the processing polygon.

In the preferred embodiment of the process of this invention, this is expressed in such a way that the surfaces F1, F2, F3 bounded by the respective polygons can exist with equal status. As shown in FIG. 2a, the processing polygon B1 first intersects the upper edge of the surface F3, then the boundary edge between F3 and F2, and on emergence from the workpiece R again the boundary edge between F3 and F2.

According to this invention, the intersection point determination is performed in the following simple steps:

On entry of the processing polygon B1 into the surface F3, only the surface F3 is affected; neither the surface F2 nor the surface F1 is touched. For this reason, at this point in time the intersection point analysis, taking into account the third dimension, is only performed between the processing polygon B1 and the surface F3. Intersection point calculations with the other surfaces can be omitted, since these other surfaces (F1, F2) are hierarchically not contained in F3.

Even with this simple state of affairs the expenditure in calculation for the polygon linkage is advantageously reduced.

As the processing polygon B1 emerges at the lower edge of F3 and enters F2, the intersection point analysis must take into account the surface F2, again taking into consideration the third dimension.

With the aid of the side view it is apparent that the boundary line between F2 and F3 is altered, but that there are no true points of intersection between the surface F2 and the processing polygon B1.

The surface F3 is thus altered by this processing operation, and in this way the partial surfaces F3.1, F3.2, F3.3 are generated, which are hierarchically contained in the surface F3. Since the surface F1 is hierarchically not contained in the examined surfaces F2, F3, the intersection point analysis does not need to be performed for the surface F1.

In the next processing step, milling is done by the processing polygon B2 into the surface F1, as shown in FIGS. 3a and 3b. Since in accordance with this invention intersection point analysis is only performed for those polygons that are hierarchically contained in the surface being momentarily processed, in this processing step the important advantage of this invention is already clearly shown: the numerous edges of F2, F3.1, F3.2 and F3.3 do not have to be examined at all for possible intersection points, since they are not hierarchically contained in F1. As shown in FIGS. 3c and 3d, this processing operation generates the partial surfaces F1.1 and F1.2.

FIGS. 4a through 4d represent a fourth processing operation, in which a series of linkages must be made between the processing polygon B3 and the polygons F1, F2 and F3 of the workpiece, or to their partial surfaces. The processing polygon B3 intersects the surface F1, or the partial surfaces F1.1 and F1.2 contained within it. Intersection calculations are made on entry into the partial surface F1.2, and on transition from the partial surface F1.2 to the partial surface F1.1. Furthermore, intersection point calculations are performed at the transition of the processing polygon B3 from the partial surface F1.1 to the surface F2, as well as on transition from F2 to F3.2 and F3.3. Except for the partial surface F3.1, each partial surface is altered. The partial surface F3.1 therefore can be left out of consideration for the intersection point calculations. As already described, in this embodiment the intersection point analysis always takes into account the third dimension, so that with the aid of the resulting data structures, the microprocessor generates an altered model of the processed workpiece.

Successively, each tool path is linked with the data structure to generate an altered data structure indicative of the new altered workpiece. In each case the altered workpiece generated in the preceding processing operation is used as a starting point for the next processing operation to determine the starting point of the new processing polygon from the surface. This intersection point determination is continued until the starting surface is again reached.

The above-described process leads to a considerable reduction in the calculation time and memory requirements with respect to conventional processes such as are described, for example, in the reference "Barton, E. E., Buchanan, I: The Polygon Package, Computer-Aided Design, Vol. 12, No. 1, January 1980, pp. 3–11. " Thus, with this invention it is not necessary to set up auxillary data structures. With a low expenditure for computer hardware, it is possible with the aid of the hierarchic data structure described above to examine which polygons overlap the momentary processing polygon. By considering only the momentarily affected polygons in the linkage with the processing polygon, the execution of the process is made possible with smaller computer systems, such as those presently used in numerically-controlled machine tools.

FIG. 5 shows a block circuit diagram of an arrangement for executing the process described above. The control microcomputer 1 includes a working memory 2. The control microcomputer 1 monitors a minicassette in an external memory 3 in order to generate tool paths which are used to control the machine axes of the numerically-controlled machine 5 via the I/O device 4.

The microcomputer 1 accepts and processes operator inputs via the keyboard 7 by means of the I/O device 6.

A graphic microcomputer 8 is included which includes a working memory 9 used to prepare dialogue masks for operating dialogues. The graphic microcomputer 8 formats actual values, calculates according to the process described above the graphic data for the representation of the particular workpiece, which is represented by the CRT controller with videogenerator 10 on the color picture screen apparatus 11.

Of course, it should be understood that a range of changes and modifications to the preferred embodiment described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a process for graphically representing a structure that can be altered by an object, of the type in which both the structure and the object as well as relative movements therebetween are represented by selected respective data structures, the improvement comprising:
   (a) generating a set of polygons representative of the structure from the respective data structure;
   (b) determining a processing region corresponding to the object and a selected relative movement between the object and the structure;
   (c) determining intersections between the processing region and only those polygons which overlap the processing region and altering the respective data structure to reflect changes to those polygons intersected by the processing region in order to represent the altered structure; and
   (d) repeating steps (b) and (c) for another selected relative movement of the object to represent further alteration of the structure.

2. The process of claim 1 wherein the polygons extend in two dimensions and wherein the intersection determination of step (c) takes into account a third dimension, transverse to the two dimensions.

3. The process of claim 2 further comprising the steps of analyzing the data structure for the altered structure to locate a set of edges present in the structure but eliminated from the altered structure; and erasing the set of edges.

4. The process of claim 3 further comprising the step of graphically representing only visible edges of the altered structure.

5. The process of claim 1 further comprising generating an internal model of a workpiece from the data structure for the structure.

6. The process of claim 1 wherein the processing region comprises a processing polygon generated from the data structures for the object and for the selected relative movement between the structure and the object.

7. The process of claim 1 further comprising the step of graphically representing the altered structure two dimensionally in several views.

8. The process of claim 1 further comprising the step of graphically representing the altered structure in perspective.

9. The process of claim 1 further comprising the step of graphically representing the altered structure at a first scale, and graphically representing a portion of the altered structure at a second, enlarged scale.

10. The process of claim 1 further comprising the step of graphically representing the altered structure in color coded form to clarify the altered structure.

11. An apparatus for graphically representing a structure that can be altered by an object, of the type in which both the structure and the object as well as relative movements therebetween are represented by selected respective data structures, the apparatus comprising:
   means for generating a set of polygons representative of the structure from the respective data structure;
   means for determining a processing region corresponding to the object and the selected relative movement between the object and the structure;
   means for determining intersections between the processing region and only those polygons which overlap the processing region and altering the respective data structure to reflect changes to those polygons intersected by the processing region in order to represent the altered structure; and
   means for displaying a representation of the respective data structures.

12. The invention of claim 11 wherein the polygons extend in two dimensions and wherein the means for determining the intersections comprises means for taking into account a third dimension transverse to the two dimensions.

13. The invention of claim 12 wherein the apparatus further comprises means for analyzing the data structure for the altered structure to locate a set of edges present in the structure, but eliminated from the altered structure and for erasing the set of edges.

14. The invention of claim 11 wherein the means for determining a processing region comprises means for generating a process polygon from the data structures for the object and for the selected relative movement between the structure and the object.

15. An apparatus for graphically representing a workpiece to be processed by a numerically controlled machine tool, wherein the workpiece and tool are movable relatively to one another along a path, the apparatus comprising:
   means for storing data representative of the shape of the workpiece, the shape of the tool, and the path of relative movement of the tool and the workpiece;
   means for determining boundary polygons representative of the workpiece surface with the aid of the stored data;
   means for hierarchically ordering the boundary polygons;
   means for selecting a surface of the workpiece based upon the path of the tool;
   means for altering the boundary polygons by successive intersection point calculations in correspondence with a path of the tool such that only those intersection points with the boundary polygons that are hierarchically contained in the selected surface are used in the calculations; and
   means for displaying the workpiece and alterations to the workpiece as determined from the boundary polygons and from the altered boundary polygons.

* * * * *

UNITED STATES PATENT AND TRADEMARK OFFICE
CERTIFICATE OF CORRECTION

PATENT NO. : 4,757,461
DATED : July 12, 1988
INVENTOR(S) : Wilfried Stöhr et al.

It is certified that error appears in the above-identified patent and that said Letters Patent is hereby corrected as shown below:

IN THE ABSTRACT

On line 17 of the Abstract, please delete "nto" and substitute therefor --not--.

IN THE CLAIMS

In column 6, line 60, please delete "a" and substitute therefor --the--.

Signed and Sealed this

Thirteenth Day of July, 1993

Attest:

MICHAEL K. KIRK

Attesting Officer        Acting Commissioner of Patents and Trademarks